June 22, 1943.　　　C. W. BAIRD　　　2,322,217
VIBRATION CONTROL APPARATUS
Filed March 6, 1942
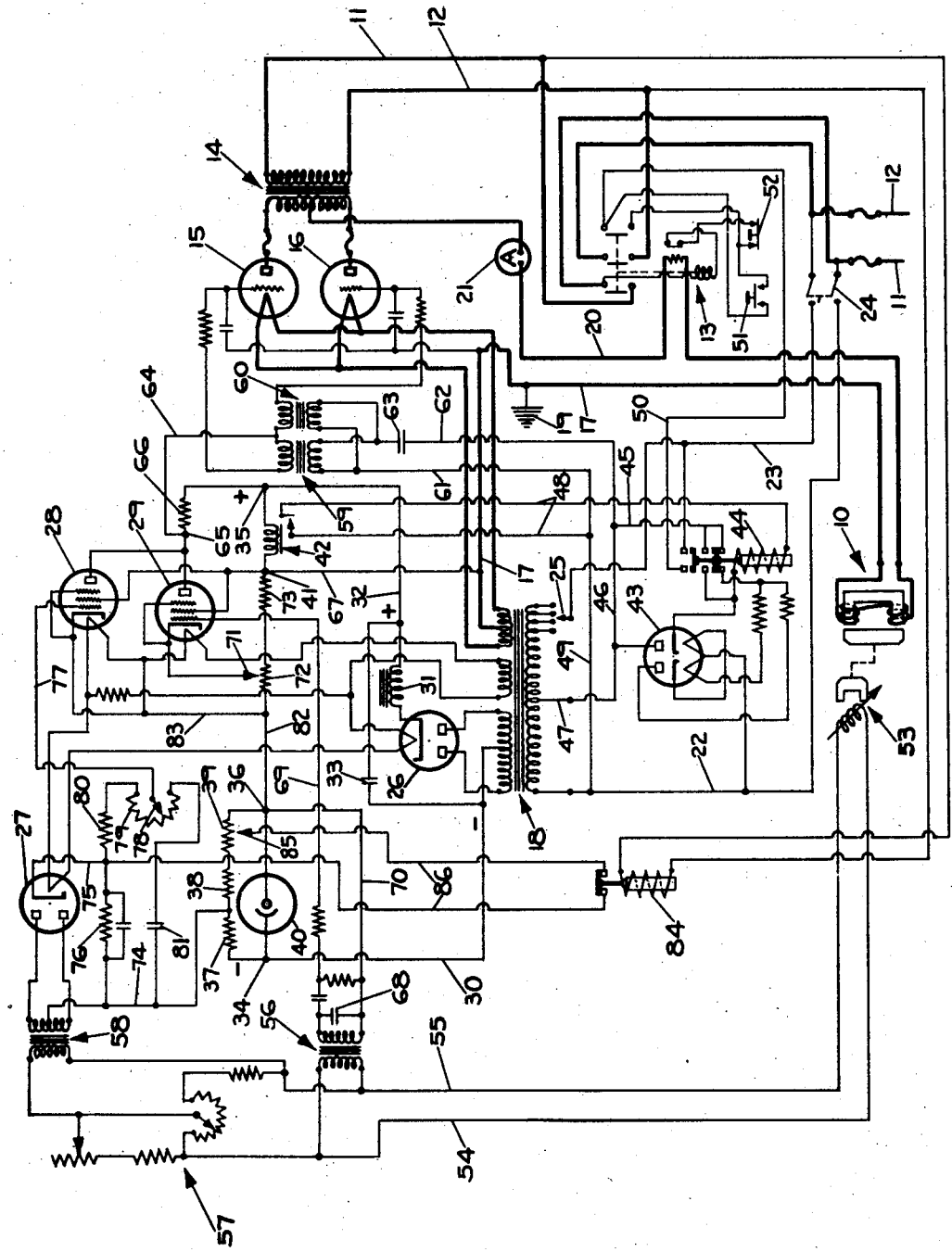
INVENTOR:
CLYDE W. BAIRD,
By Chas. M. Nissen,
ATTY.

Patented June 22, 1943

2,322,217

UNITED STATES PATENT OFFICE 2,322,217

VIBRATION CONTROL APPARATUS

Clyde W. Baird, Columbus, Ohio, assignor to The Traylor Vibrator Company, a corporation of Colorado Application March 6, 1942, Serial No. 433,538

20 Claims. (Cl. 172—240)

This invention relates to control apparatus adapted to control both the frequency and the amplitude of vibration of a vibratory electromagnetic motor.

An object of the invention is to provide improved apparatus of the above type which is extremely efficient in operation and which involves a minimum of parts.

A further object of the invention is to provide apparatus of the above mentioned type in which improved means are provided to control the amplitude of vibration of a vibratory motor involving the phase shift method to control power tubes which are employed to control the current flow to said motor.

A further object of the invention is to provide an improved amplitude control system for a vibratory electromagnetic motor.

A further object of the invention is to provide a control circuit for a vibratory electromagnetic motor which includes means to prevent undesirable high amplitudes of vibration during the starting periods of vibration.

Still another object of the invention is to provide a control circuit for a vibratory electromagnetic motor in which mechanism is provided to shut down the system in case of a failure of vital control circuit parts.

Still another object of the invention is to provide control circuits for a vibratory electromagnetic motor which eliminates entirely the necessity for any adjustable power transformers or mechanism for adjusting any such transformers.

Other objects of the invention will appear hereinafter, the novel features and combinations being set forth in the appended claims.

In the accompanying drawing,

The single figure is a wiring diagram of the system incorporating the features of my invention.

This application represents in many phases an improvement on the invention disclosed in my application Serial No. 371,314, filed December 23, 1940, entitled Vibration control apparatus, now Patent No. 2,287,406, dated June 23, 1942, to which reference is made for a detailed description of certain elements or combinations herein disclosed in the system disclosed in the drawing. There is included means which provides for both automatic amplitude control of the amplitude of vibration of the vibratory motor as well as automatic control of the frequency of the vibratory motor but it is to be understood that either the amplitude control or frequency control may be employed alone and in various aspects my invention relates to each of these sub-combinations of the entire system.

Referring to the drawing, there is seen at 10 a vibratory motor which in most instances will be part of a vibratory feeder or screen and for example may embody the structure disclosed in the patent to James A. Flint, No. 2,094,787, dated October 5, 1937. If desired, the motor 10 may follow the structure disclosed in my prior application, Serial No. 297,622, filed October 2, 1939, now Patent No. 2,287,223, dated June 23, 1942, entitled Vibrating apparatus control. Power for the motor 10 is supplied from a source of alternating current by way of conductors 11 and 12 which lead through a magnetic control switch 13 which is of standard design and which is described in detail in my above mentioned Patent No. 2,287,406. The conductors 11 and 12 connect power to the transformer 14, to the secondary outer terminals of which are connected the plates or anodes of power tubes or relays 15 and 16 which, in order to provide adequate current carrying capacity, are preferably of the gaseous electron discharge type. The power tubes 15 and 16 are so connected with reference to the transformer 14 as to provide a full wave rectifier, the output circuit from said tubes being from cathodes or filaments to conductor 17 which leads to the center tap of a secondary of transformer 18, which said secondary provides the heating current for the cathodes of said tubes 15 and 16 in a well understood manner. Conductor 17 is preferably grounded at 19 and it leads to one terminal of the field winding of the motor 10. The other terminal of the field winding of motor 10 extends by way of conductor 20 through an ammeter 21 to the center tap of the secondary of transformer 14. It is evident that in the absence of any control on the grids of power tubes 15 and 16 pulsating direct current would flow to the motor 10 having a frequency determined by the frequency of the power lines 11 and 12 which in most typical instances in this country will be 60 cycles. Reactance of the windings of motor 10 will, of course, tend to smooth out the normal pulsations in this direct current. However, as hereinafter described, the grids of the power tubes 15 and 16 are employed to control the current flowing to the motor 10 so that said motor 10 will vibrate at its own natural period of vibration and in addition its amplitude of vibration will be automatically maintained at any predetermined value, which predetermined valve may be manually adjusted at the desire of the operator. As pointed out in my above mentioned Patent No. 2,287,406, it is desirable to insure heating of the filaments or cathodes of power tubes for a predetermined minimum of time before voltage is applied to the plates thereof and in said application I have disclosed and described in detail mechanism to accomplish this result. Substantially the same mechanism is preferably employed in the system herein disclosed which I shall now briefly describe.

Leading from the power conductors 11 and 12 are branch conductors 22 and 23 which are controlled by a switch 24 which is closed to start operation of the system. Conductor 22 leads directly to one terminal of the primary winding of transformer 18 and conductor 23 leads directly to a variable tap 25 at the other end of said primary winding so that when switch 24 is closed transformer 18 is energized. When transformer 18 is energized all of its three secondary windings are energized, the one on the right energizing the filaments or the cathodes of the power tubes 15 and 16 as previously mentioned. The center secondary winding energizes the filaments of each of the four vacuum tubes 26, 27, 28 and 29, the functions of which are described in full detail hereinafter but it may be noted at this time that tubes 26 and 27 are of the indirectly heated cathode full wave rectifier type while tubes 28 and 29 are pentode tubes having indirectly heated cathodes. The left hand secondary of transformer 18 is connected with tube 26 to provide a full wave rectifier which provides a source of plate current for the tubes 26, 28 and 29. The center tap of said secondary leads to conductor 30 which, as indicated, is the negative terminal of this source of plate potential. The cathode of said tube 26 is connected through a filtering choke coil 31 to conductor 32 which is the positive terminal of this source of plate potential. The usual and well known filtering condenser 33 is connected across conductors 30 and 32. Conductors 30 and 32 terminate at the opposite ends of a potentiometer which may be considered as extending between negative terminal 34 and positive terminal 35. Between said terminals 34 and 35 is provided a plurality of resistors which provide a desirable source of potentials for various functions as hereinafter described. It may be pointed out, however, that between terminals 34 and 35 is an intermediate terminal 36 and that resistors 37, 38 and 39 are connected between said terminals 34 and 36. Also connected between said terminals 34 and 36 is a voltage regulator tube 40 which may be of any well known construction such as a neon tube. Between the terminals 34 and 35 is another intermediate terminal 41. Between terminals 35 and 41 is a coil of a relay 42 which coil has a predetermined amount of resistance and acts not only as a relay but as an effective resistor in the control system as hereinafter described more completely.

The filament heating time delay protective circuit associated with the conductors 22 and 23 includes a double cathode-anode vacuum tube 43 and associated relay 44. When switch 24 is first thrown, relay 44 is deenergized and through its bottom contacts closes the circuit which extends from conductor 22 through the left hand heating filament of tube 43, thence through a resistor and bottom contacts of relay 44 by way of conductors 45, 46 and 47 to a center tap of the primary of transformer 18, thus heating left hand filament of tube 43. After a predetermined time this filament will heat the left hand cathode of tube 43 and current will flow from said cathode to the left hand plate of tube 43 and through the right hand filament thereof thence by way of said lower contacts of relay 44 and the conductors previously described. After a predetermined time during which said right hand filament is heated, the right hand cathode of tube 43 will become conducting and current will flow through it and the right hand anode thereof, the circuit being therefrom the center tap of the primary transformer 18 by way of conductor 47, thence through conductor 46 to the right hand plate of tube 43, then through right hand cathode of tube 43 and the energizing coil of relay 44, thence by conductor 48 through the contacts of relay 42 which at this time are closed due to energization of the coil thereof as above described and thence by conductor 49 to the left hand terminal of the primary of transformer 18. It is thus evident that after a predetermined time following the closing of switch 24 relay 44 will be energized, closing the holding circuit thereof over its intermediate contacts by way of the contacts of relay 42 which act as a protective relay so that in the event of any failure of adequate current in said relay 42, such as would be caused by failure of tube 43, the relay 44 will fall out and disconnect the system. This is to take care of a situation where, through some difficulty such as failure of tube 40, the system would otherwise operate automatically to demand full power from the power tubes 15 and 16 and the amplitude control would be effectively lost, thus possibly causing damage to the vibratory motor 10. When relay 44 is energized its top contacts connect conductor 23 to conductor 50 which then makes voltage available for the magnetic switch 13. The start push button 51 of said magnetic switch 13 is then closed and will effect the closing of the power circuit through the power contacts of said magnetic switch over an obvious circuit. It is, of course, evident that until conductor 50 is energized the closing of start push button 51 will have no result. Once relay 13 is energized it, of course, provides the usual holding circuit including normally closed stop push button 52. Said magnetic control switch 13 also includes the usual overload current relay in the stop circuit.

In its most complete aspect the invention contemplates an arrangement whereby the frequency of vibration of the vibratory motor 10 is determined by its own natural period of vibration and in addition the amplitude of vibration thereof is automatically maintained constant.

As previously pointed out in other aspects of the invention, either the amplitude control or the frequency control may be employed separately. To provide both the frequency control and the amplitude control so that the frequency of the vibration of the motor 10 is independent of the frequency of the current delivered to the power lines 11 and 12 and preferably has a frequency which is appreciably less than the power supply, I provide an adjustable magnetic pickup device 53 which includes as one illustration an armature which is interconnected to the armature or deck of the vibratory motor 10. In my Patent No. 2,287,223, I have disclosed one desirable form of such pickup device but it is obvious that other forms may be employed. Vibratory motion of the motor 10 is imparted to the pickup device 53 and generates in its coils a voltage which has a frequency determined by the frequency of the vibration of the motor 10 and a value which is proportional to the amplitude of vibration of said motor 10, or any selected part thereof, such as the armature or the deck. The terminals of said pickup device are connected over conductors 54 and 55 which lead to the primary winding of a stepup transformer 56 which may be considered as the first part of a frequency control channel of the control system. In other words, the secondary voltage of the transformer 56 is employed to control the conductivity of the tubes 15 and 16 as hereinafter described in detail, so that the effective result of the current flow through said tubes is an impulse, which may actually be made up of a plurality of separate impulses the result of which is comparable to a single impulse, which controls the frequency of vibration of the motor 10.

It may be stated at this time that during one half of the cycle of the alternating voltage of the pickup 53 which, of course, has the same frequency as the alternating voltage of the secondary transformer 56 the entire control of the tubes 15 and 16 is under this frequency control channel and nothing which happens in the amplitude control channel is of significance. During the other half cycle of the voltage generated by the pickup 53 the amplitude control channel has full control and the frequency control channel is without operative significance. The circuits which provide this and the method in which it is effected are described hereinafter.

Connecting across the conductors 54 and 55 and having no influence on the voltage delivered to or by the transformer 56 is a compound potentiometer system which provides for both coarse and fine adjustment of the proportion of the voltage across conductors 54 and 55 which is delivered to the primary winding of the transformer 58. Potentiometer 57 and transformer 58 are distinct parts of the amplitude control channel of the system and by adjusting the variable taps of the potentiometer 57 the value at which the amplitude of vibration of the motor 10 will become stabilized and maintained may be variably determined by the operator.

Before describing the circuits of the frequency control channel and the amplitude control channel, it may be pointed out that the cathode-grid or control circuits of the power tubes 15 and 16 have connected therein phase shift transformers 59 and 60 respectively, the primaries of which are connected in parallel and are energized by way of conductors 61 and 62 which are connected to conductors 49 and 46, respectively. A condenser 63 is provided for conductor 62 which cooperates with inductive reactance transformers 59 and 60 so that the phase relation of the grid-cathode voltages on the tubes 15 and 16 lags the cathode-anode voltages of said tubes, preferably by approximately 90 degrees. It is evident that if such a condition were always maintained and there was no other control influenced on said grids (which in practice is not the fact), during each half cycle of the plate voltage on tubes 15 and 16 there would be a current flow through tubes 15 and 16 alternately only during approximately the last half of each half cycle. As is well known, the power delivered by any tube may be adjusted by controlling this phase relation between the grid voltage and the plate voltage and, I employ the mechanism in the amplitude control channel to effect this shifting of the grid voltages of the tubes 15 and 16 to control automatically the amount of effective current flow to the motor 10, to maintain said amplitude constant. Furthermore, I shut off the tubes 15 and 16 entirely quite independent of the amount of current flow if current flowed at all during each alternate half cycle of the voltage generated in the pickup 53, which is the same in frequency, as the voltage in the transformer 56.

It may further be stated that the grid shift above mentioned, which operates to provide the amplitude control, is provided in the system of my invention by a superposing on the alternate current grid voltage which lags the plate voltage preferably by 90 degrees, a direct current voltage which may be variable in amount and which may change in polarity thereby to effect a wide swing in the resulting phase relation of said grid voltage with respect to said plate voltage from the 90 degree lagging condition which would prevail in the absence of any superposed direct current voltage.

The grid-cathode circuits for the tubes 15 and 16 may be traced as follows: The grid of tube 15 is connected through a current limiting resistor to one terminal of the secondary of transformer 59. Likewise one terminal of the secondary of transformer 60 is connected to the grid of tube 16. The other secondary terminals of transformers 59 and 60 are connected together and connect by way of conductor 64 to terminal 65. Terminal 65 is directly connected to the plates or anodes of both of the tubes 28 and 29 and is connected through resistor 66 to the positive terminal 35 of the previously mentioned potentiometer or source of direct current plate supply. To complete the circuit from terminal 65 to the cathodes of the power tubes 15 and 16 and thus to complete the control circuit for said tubes 15 and 16, said circuit extends through resistor 66, terminal 35, thence through the coil of relay 42 to terminal 41, then by way of conductor 67 to the conductor 17 which is connected to the center tap of the right hand secondary of transformer 18, the outer terminals of which are connected to the cathodes of power tubes 15 and 16. It is thus evident that the voltage generated in the secondary of transformer 59 is always applied to the grid-cathode or control circuit of the tube 15 when the system is energized and likewise the voltage generated in the secondary of the transformer 60 is applied to the grid or control circuit of tube 16. As also previously mentioned, each of these voltages preferably lags the plate or output alternating voltage of the associated tubes 15 or 16, preferably by approximately 90 degrees. To control the frequency in which the motor 10 vibrates there is superposed upon this alternating voltage, successive similar half cycles (or alternate half cycles) of a voltage which is controlled and determined by the voltage appearing on the secondary of transformer 56, so that during said alternate half cycles or successive similar half cycles a very high negative D. C. potential is superposed on said lagging A. C. potential in said grid or input circuits so as to render said tubes 15 and 16 entirely non-conducting during said successive similar half cycles or alternate half cycles, the frequency of which is, of course, determined by the frequency of the alternate voltage in the pickup 53 which is the frequency of vibration of the motor 10. It is, of course, evident that during these half cycles the effect of the amplitude control channel is zero.

I shall now describe the circuit which provides the frequency control above broadly outlined. The secondary of the step up transformer 56 feeds an advancing phase shift net work 68 which compensates for time lag in the system the resulting voltage being impressed on conductors 69 and 70, the former leading through a grid resistance to the control grid of the frequency control vacuum tube 29. The conductor 70 extends to the terminal 36 and this terminal is connected to the indirectly heated cathode of tube 29 through a variable tap 71 on a resistor 72 connected between terminal 36 and terminal 41. It is thus evident that the frequency control voltage which has a frequency determined by the frequency of vibration of the motor 10 is applied to the input or control circuit of the frequency control vacuum tube 29. This input or control voltage causes the frequency control tube 29 to become alternately conducting and non-conducting during the successive positive and negative half cycles thereof. When said grid is negative, the tube 29 being non-conducting does not function in the circuit. During the half cycle that said input circuit is positive said frequency control vacuum tube 29 conducts current which flows in the plate circuit which may be traced from the anode or plate of tube 29 to terminal 65 then through resistor 66 to terminal 35 which is the positive terminal of the source of D. C. plate voltage as previously set forth. The cathode of said tube 29 is connected to the above mentioned potentiometer by tap 71 which potentiometer extends between positive terminal 35 and negative terminal 34. It is, of course, evident that tap 71 is negative with respect to terminal 35 by virtue of the voltage drop across the portion of resistor 72 with which tap 71 is associated, the voltage drop across resistor 73 which is part of the above mentioned potentiometer and the voltage drop across the coil of relay 42. It is evident from the above traced input or control circuits of the tubes 15 and 16 that the D. C. voltage drops across the resistor 66 and the coil of relay 42 are superposed on the lagging voltages in the secondaries of transformers 59 and 60. Stated another way, the resulting D. C. voltage between terminal 41 and terminal 65 is superposed upon lagging A. C. voltage in the input circuits of tubes 15 and 16.

The value of the voltage drop across the relay 42, or between terminals 35 and 41, will be substantially constant.

A predetermined current flow through resistor 66 from tube 29, or for that matter from tube 28, will produce such a current flow as to make the voltage between terminals 41 and 65 equal to zero since both the terminals 41 and 65 are negative with respect to the terminal 35 during each alternate half cycle of pickup voltage. When current flows from tube 29 through resistor 66 the terminal 65 is made highly negative with respect to terminal 41 at a value sufficient to stop the flow of the current in the tubes 15 and 16 once they are reduced to zero during their cyclic operation. In other words, this high negative bias takes complete control through the grids of tubes 15 and 16 to render them non-conducting. It is thus evident that the frequency of the alternate current generated in the pickup 53 is effective during alternate or similar half cycles to take complete control of the grid circuits of the power tubes 15 and 16 to render said tubes non-conducting and consequently during these periods no current will flow to the motor 10. As previously mentioned, during the other alternate half cycles of the pickup voltage, tube 29 is rendered non-conducting and it has no effect whatever on the system during said half cycles, during which the amplitude control channel of the system becomes effective, as is now to be described.

During the half cycles that the amplitude control channel is effective, tube 28 is effective to produce current flow in the resistor 66 since its anode or plate is connected to terminal 65 as is the anode of tube 29. The current flow from tube 28, however, unlike the current flow from tube 29, normally is not sufficient to produce such a negative drop between terminals 41 and 65 as to shut off the current flow in tubes 15 and 16 but the voltage drop produced between terminals 41 and 65 may be positive, negative or zero and its value, both in the positive and negative sense, is variable as determined by the current flow in the plate circuit of said tube 28. Consequently this voltage drop across terminals 41 and 65, being direct current in character and being superposed on the lagging A. C. voltages provided in the secondaries of transformers 59 and 60 cooperates therewith to provide a grid shift method of amplitude control, that is, the phase relation between the voltage upon the grids of tubes 15 and 16 is thus automatically shifted with respect to the anode or plate voltages thereof.

Referring particularly to the circuit for the amplitude control channel, it is to be seen that the secondary of transformer 58 is connected to tube 27 as a full wave rectifier; the two outer terminals of said transformer secondary being connected to the plates of tube 27 and the center tap thereof being connected to conductor 74. The cathode of the full wave rectifier tube 27 is connected by conductor 75 to one terminal of a resistor 76 provided with a by-pass filter condenser, the other terminal of which resistor is connected to conductor 74. It is thus evident that the current flow through the full wave rectifier 27 flows through the resistor 76 and, the value of the direct current voltage thereby produced across resistor 76 is thus directly proportional to the voltage generated in the secondary winding of transformer 58 which voltage for any predetermined position of the potentiometer system 57 is proportional in value to the voltage generated in the pickup coil 53 and to the amplitude of vibration of the motor 10. In short, the D. C. voltage drop across resistor 76 is a direct indication or measurement of the amplitude of vibration of motor 10 for any fixed position of said potentiometer system 57.

This variable voltage bucks a fixed voltage which is supplied to the input, grid, or cathode-grid circuit of the amplitude control vacuum tube 28, which fixed voltage is the voltage drop across the resistors 38 and 39, and the variable voltage drop across resistor 76 may be either equal to the voltage drop across resistors 38 or 39, or greater or less than it, so that the resulting bias on the control grid of tube 28 may be zero, negative or positive, and the negative or positive value may vary in amount. The grid or input circuit for the tube 28 may be traced from the control grid to conductor 77, thence through variable tap 78 of a time delay net work, including variable resistor 79 and fixed resistor 80 together with condenser 81, the input circuit extending through resistor 80, through resistor 76 which supplies the variable D. C. voltage, then by way of conductor 74 through resistors 38 and 39 to terminal 36. From the terminal 36 the circuit extends by way of conductors 82 and 83 to the cathode of the vacuum tube 28.

In addition to the circuits above described, it may be pointed out that I have provided an additional protective circuit which prevents unusual and undesirably large amplitudes of vibration of the motor 10 during the transient starting period. It has been found in practice that unless some protective means is provided when vibration is first started, the voltage provided by amplifier 28 tends to call for greater power to increase the amplitude and there is a tendency for the motor to pound, or to have an unduly large amplitude of vibration, unless this is overcome. To this end I provide a relay 84 the contacts of which are normally closed and which normally connect the right hand terminal of resistor 76 to an adjustable point on resistor 39 by way of variable tap 85 over conductor 86. It will be seen that relay 84 is de-energized when the system is first started by the closing of switch 24 which, as above described, provides direct current at the negative terminal 34 and positive terminal 35. Since the tap 85 is slightly negative with respect to the terminal 36 which is connected to the cathode of tube 28 the grid of said tube 28 will be slightly negative at this time and will not permit an unusual flow of current through said tube 28 but will maintain it at a moderate amount. When energy is supplied to the transformer 14, relay 84 opens its contacts and opens conductor 86. The charge on the condenser 81, which has been charged by the closure of conductor 86, since one terminal of said condenser 81 is connected to conductor 74 and the other through resistors 79 and 80 and conductor 86 is connected to tap 85 which is positive with respect to conductor 74, will, of course, gradually leak off through resistors 79, 80 and 76 when relay 84 is energized and conductor 86 is broken.

In the operation of the device, alternating current from a power supply, such as 60 cycle current or 50 cycle current, is supplied to the power conductors 11 and 12. Switch 24 is first closed to place the system in operation which immediately supplies energy to heat the filaments of the electron discharge tubes including vacuum tubes 26, 27, 28, 29 and the gaseous or power tubes 15 and 16. After a predetermined time interval, relay 44 will be energized whereupon start push button 51 may be closed, or has already been closed, and the magnetic switch 13 will operate to close the line current to the transformer 14. This will cause a current impulse to flow in the power circuit leading to the motor 10, by way of conductors 17 and 20 through the power tubes 15 and 16. The resulting movement in the motor 10 will induce a voltage in the pickup winding 53 which voltage will be delivered to the primary of transformer 56 in the frequency control channel without alteration and which will be delivered to the primary winding of the transformer 58 in the amplitude control channel under the control of the potentiometer system 57. The motor 10 will thus have vibration initiated in it and after a very few strokes it will vibrate substantially uniformly at its natural period of vibration and the frequency of the pickup voltage will be determined by said natural period of vibration of motor 10.

As above described, the frequency control channel, which may be considered as starting with the transformer 56 will provide, during successive similar half cycles of said control voltage, a very high D. C. voltage which is supplied to the grids of power tubes 15 and 16 so that during said half cycles said tubes 15 and 16 are entirely non-conducting and no current will flow during said half cycles to the motor 10 over the power circuit. During the other alternate or similar half cycles the frequency control tube 29 is without effect since its grid is negative and no current flows in the plate circuit thereof and it is during this time that the automatic control provided by the amplitude control channel is effective. The voltage provided by the secondary of transformer 58 in said amplitude control channel is rectified to produce a direct current voltage thereby across resistor 76 proportional to the amplitude of vibration for any predetermined setting of potentiometer system 57. This variable D. C. voltage bucks a fixed D. C. voltage in the grid circuit of the volume control amplifier tube 28 and the value of the current flow in the plate circuit of said tube 28 varies in accordance with the amplitude of vibration of the motor 10. Said plate current flowing in tube 28 is then effective during alternate half cycles, when the frequency control channel is not effective, to superpose a direct current voltage, which is variable in value and may be either positive or negative, upon the fixed lagging A. C. voltage continuously supplied to the grids of tubes 15 and 16 so as effectively to vary the phase relation between the grid voltages and the plate voltages of said power tubes 15 and 16, thus providing a phase shift control of the current flow through each tube 15 and 16 during each cycle of plate voltage thereof. The amplitude control is automatic in character because if the amplitude of vibration of the motor 10 becomes larger than the preselected value the generated voltage in pickup 53 and the consequent D. C. voltage in resistor 76 will increase above the preselected value and this will change the bias on the control grid of tube 28 in the positive direction and increase its plate current flow which, in flowing through resistor 66, will change any D. C. voltage bias superposed on lagging A. C. voltage in a negative direction and thus decrease the current flow through the tubes 15 and 16 producing a reduction in the amplitude of vibration of the motor 10. A converse condition will, of course, produce a converse result. It is evident that the stable or normal vibration of the motor 10 may be adjusted at any desired value to which it will be automatically maintained by the simple expedient of adjusting the potentiometer system 57. The protecting features provided by the relays 42 and 84 were explained above and need not be repeated at this time.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In apparatus of the class described, the combination with a vibratory electromagnetic motor, of a power circuit therefor including a source of current, electron discharge relay means in said circuit controlling the flow of current to said motor, said electron discharge relay means including discharge control means, a control circuit for controlling said discharge control means, said control circuit including means generating an alternating voltage having a frequency determined by the frequency of vibration of said vibratory electromagnetic motor and a value determined by its amplitude of vibration, means operative in response to one half of each cycle of said alternating voltage to control said discharge control means thereby to control the frequency of vibration of said electromagnetic motor, and means responsive to the other half of each cycle of said alternating voltage to control the phase relation between the anode and discharge control means voltages of said electron discharge relay means thereby to control the amplitude of vibration of said electromagnetic motor and maintain it substantially constant.

2. In apparatus of the class described, the combination with a vibratory electromagnetic motor, of a power circuit therefor including a source of current, electron discharge relay means in said circuit controlling the flow of current to said motor, said electron discharge relay means including discharge control means, a control circuit for controlling said discharge control means, said control circuit including means generating an alternating voltage having a frequency determined by the frequency of vibration of said vibratory electromagnetic motor and a value determined by its amplitude of vibration, means operative in response to one half of each cycle of said alternating voltage to control said discharge control means thereby to control the frequency of vibration of said electromagnetic motor, and means responsive to the other half of each cycle of said alternating voltage to control the amplitude of vibration of said electromagnetic motor and maintain it substantially constant.

3. A vibration control circuit including a source of alternating control voltage, a power tube to be controlled, said power tube having a control grid and a source of anode voltage, means providing a voltage on said control grid which is normally lagging approximately 90 degrees relative to said anode voltage, and means superposing a direct current voltage on said lagging voltage which is proportional to the alternating control voltage thereby to control the power output of said power tube.

4. A vibration control circuit including a source of alternating control voltage, a power tube to be controlled, said power tube having a control grid and a source of anode voltage, means providing a voltage on said control grid which is normally lagging relative to said anode voltage, and means superposing a direct current voltage on said lagging voltage which is proportional to the alternating control voltage thereby to control the power output of said power tube.

5. A vibration control circuit including a source of alternating control voltage, a power tube to be controlled, said power tube having a control grid and a source of anode voltage, means providing a voltage on said control grid which is normally lagging relative to said anode voltage, means responsive to one-half of each cycle of said alternating control voltage to control said grid to render said power tube non-conducting, and means responsive to the other half of each cycle of said alternating control voltage to superpose a direct current voltage on said lagging voltage which is proportional to the alternating control voltage thereby to control the power output of said power tube.

6. A vibration control circuit including a source of alternating control voltage, a power tube to be controlled, said power tube having a control grid and a source of anode voltage, means providing a voltage on said control grid which is normally lagging relative to said anode voltage, means responsive to one-half of each cycle of said alternating control voltage to control said grid to render said power tube non-conducting, and means responsive to the other half of each cycle of said alternating control voltage to modify the action of said normally lagging voltage to control the power output of said power tube.

7. In apparatus of the class described, the combination with a vibratory motor, means including a power tube for supplying current to said motor to cause it to vibrate, automatic means for controlling the amplitude of vibration of said vibratory motor, and means operative during starting of vibration of said motor to prevent the amplitude of vibration of said motor becoming undesirably large as said automatic amplitude control means is operating during a transient condition, said last-named means including a condenser which is charged before vibration of said motor starts and is allowed to discharge gradually after said vibration starts.

8. In apparatus of the class described, the combination with a vibratory motor, means including a power tube for supplying current to said motor to cause it to vibrate, automatic means for controlling the amplitude of vibration of said vibratory motor, and means operative during starting of vibration of said motor to prevent the amplitude of vibration of said motor becoming undesirably large as said automatic amplitude control means is operating during a transient condition.

9. In electrical vibratory apparatus, the combination with a vibratory electromagnetic motor, means including a power tube for supplying current to said motor in impulses to cause it to vibrate, automatic means for maintaining the amplitude of vibration of said motor substantially constant including means to generate an amplitude control voltage, means responsive to the value of said control voltage which operates to increase the current flow to said motor when said control voltage decreases, a source of voltage for bucking said amplitude control voltage, and means responsive to a failure of said source of bucking voltage and operative to shut off the current supply to said motor in response to such failure.

10. In vibratory apparatus, a vibratory electromagnetic motor, a power circuit therefor, a source of amplitude control voltage, means responsive automatically to reduction in the value of said control voltage to increase the amplitude of vibration of said electromagnetic motor, said means including a source of voltage, and means responsive to failure of said last-named source of voltage to disconnect said power circuit from said motor.

11. An amplitude control circuit comprising a power tube having a control grid, a source of alternating current for the plate circuit of said power tube, a source of control voltage, means providing a substantially constant direct current bias superposed on a substantially 90 degree lagging alternating current bias on the grid circuit of said power tube, and means providing an opposing direct current voltage to said grid circuit which has a value determined by said control voltage.

12. An amplitude control circuit comprising a power tube having a control grid, a source of alternating current for the plate circuit of said power tube, a source of control voltage, means providing a substantially constant direct current bias superposed on a substantially 90 degree lagging alternating current bias on the grid circuit of said power tube, and means providing an additional direct current voltage to said grid circuit which has a value determined by said control voltage.

13. An amplitude control circuit comprising a power tube having a control grid, a source of alternating current for the plate circuit of said power tube, a source of control voltage, means providing a substantially constant direct current bias superposed on a lagging alternating current bias on the grid circuit of said power tube, and means providing an opposing direct current voltage to said grid circuit which has a value determined by said control voltage.

14. An amplitude control circuit comprising a power tube having a control grid, a source of alternating current for the plate circuit of said power tube, a source of control voltage, means providing a substantially constant direct current bias superposed on a lagging alternating current bias on the grid circuit of said power tube, and means providing an additional direct current voltage to said grid circuit which has a value determined by said control voltage.

15. A frequency and amplitude control circuit including a power tube, a source of alternating current for the plate circuit of said tube, a grid circuit for said tube, said grid circuit including a source of substantially 90 degree lagging voltage, a source of substantially constant direct current voltage tending to bias the grid positively and a source of direct current voltage which is variable in value and connected to oppose said substantially constant direct current voltage, means operable to generate a frequency and amplitude controlling alternating current voltage having a value determined by the amplitude of vibration of a vibratory member, control means operable by said controlling voltage including an amplitude control channel and a frequency control channel, said frequency control channel including means to cause a high voltage drop across said variable direct current producing means which renders said grid highly negative and thereby makes said power tube non-conducting for alternate half cycles of said alternating current control voltage, and said amplitude control channel including means which produces a voltage drop across said variable direct current producing means during succeeding alternate half cycles of said alternating current control voltage which voltage drop is proportional to the value of said control voltage and is effective to control the phase relation of the grid voltage relative to the plate voltage of said tube.

16. A frequency and amplitude control circuit including a power tube, a source of alternating current for the plate circuit of said tube, a grid circuit for said tube, said grid circuit including a source of lagging voltage, a source of substantially constant direct current voltage tending to bias the grid positively and a source of direct current voltage which is variable in value and connected to oppose said substantially constant direct current voltage, means operable to generate a frequency and amplitude controlling alternating current voltage having a value determined by the amplitude of vibration of a vibratory member, control means operable by said controlling voltage including an amplitude control channel and a frequency control channel, said frequency control channel including means to cause a high voltage drop across said variable direct current producing means which renders said grid highly negative and thereby makes said power tube non-conducting for alternate half cycles of said alternating current control voltage, and said amplitude control channel including means which produces a voltage drop across said variable direct current producing means during succeeding alternate half cycles of said alternating current control voltage which voltage drop is proportional to the value of said control voltage and is effective to control the phase relation of the grid voltage relative to the plate voltage of said tube.

17. A frequency and amplitude control circuit including a power tube, a source of alternating current for the plate circuit of said tube, a grid circuit for said tube, said grid circuit including a source of substantially 90 degree lagging voltage, a source of substantially constant direct current voltage tending to bias the grid positively and a source of direct current voltage which is variable in value and connected to oppose said substantially constant direct current voltage, means operable to generate a frequency and amplitude controlling alternating current voltage having a value determined by the amplitude of vibration of a vibratory member, control means operable by said controlling voltage including an amplitude control channel and a frequency control channel, said frequency control channel including means to cause a high voltage drop across said variable direct current producing means which renders said grid highly negative for alternate half cycles of said alternating current control voltage, and said amplitude control channel including means which produces a voltage drop across said variable direct current producing means during succeeding alternate half cycles of said alternating current control voltage which voltage drop is proportional to the value of said control voltage and is effective to control the phase relation of the grid voltage relative to the plate voltage of said tube.

18. A frequency and amplitude control circuit including a power tube, a source of alternating current for the plate circuit of said tube, a grid circuit for said tube, said grid circuit including a source of substantially 90 degree lagging voltage, a source of substantially constant direct current voltage tending to bias the grid positively and a source of direct current voltage which is variable in value and connected to oppose said substantially constant direct current voltage, means operable to generate a frequency and amplitude controlling alternating current voltage having a value determined by the amplitude of vibration of a vibratory member, control means operable by said controlling voltage including an amplitude control channel and a frequency control channel, said frequency control channel including means to cause a high voltage drop across said variable direct current producing means which renders said grid highly negative and thereby makes said power tube non-conducting for alternate half cycles of said alternating current control voltage, and said amplitude control channel including means which produces a voltage drop across said variable direct current producing means during succeeding alternate half cycles of said alternating current control voltage which voltage drop is proportional to the value of said control voltage.

19. A frequency and amplitude control circuit including a power tube, a source of alternating current for the plate circuit of said tube, a grid circuit for said tube, said grid circuit including a source of lagging voltage, a source of substantially constant direct current voltage tending to bias the grid positively and a source of direct current voltage which is variable in value and connected to oppose said substantially constant direct current voltage, means operable to generate a frequency and amplitude controlling alternating current voltage having a value determined by the amplitude of vibration of a vibratory member, control means operable by said controlling voltage including an amplitude control channel and a frequency control channel, said frequency control channel including means to cause a high voltage drop across said variable direct current producing means which renders said grid highly negative for alternate half cycles of said alternating current control voltage, and said amplitude control channel including means which produces a voltage drop across said variable direct current producing means during succeeding alternate half cycles of said alternating current control voltage which voltage drop is proportional to the value of said control voltage and is effective to control the phase relation of the grid voltage relative to the plate voltage of said tube.

20. A power control circuit including a power tube having a control electrode and a plate circuit, a source of alternating current plate supply connected to said plate circuit, and a control electrode circuit including therein a source of lagging alternating current voltage having the same frequency as said plate supply, a source of substantially constant positive control electrode biasing direct current voltage connected in said control electrode circuit, and a source of variable direct current voltage also in said control electrode circuit which bucks said constant biasing voltage, all whereby the current flow in said plate circuit is controlled by the value of said variable direct current voltage.

CLYDE W. BAIRD.